United States Patent [19]

Armstrong et al.

[11] 4,055,995
[45] Nov. 1, 1977

[54] ENGINE AIR-IN-FUEL DIAGNOSTICS

[75] Inventors: Lee R. Armstrong; Henry J. Mercik, Jr., both of Enfield, Conn.

[73] Assignee: United Technologies Corporation, Hartford, Conn.

[21] Appl. No.: 747,759

[22] Filed: Dec. 6, 1976

[51] Int. Cl.$^2$ ............................................. G01M 15/00
[52] U.S. Cl. ................................................... 73/116
[58] Field of Search ..................... 73/116, 117.3, 114

[56] References Cited

U.S. PATENT DOCUMENTS

| | | | |
|---|---|---|---|
| 3,592,053 | 7/1971 | Lucia | 73/116 |
| 3,853,002 | 12/1974 | Peck | 73/116 X |
| 3,994,160 | 11/1976 | Hanson | 73/116 |

Primary Examiner—Jerry W. Myracle
Attorney, Agent, or Firm—M. P. Williams

[57] ABSTRACT

The first one of horsepower measurements utilizing an emperically-determined horsepower constant, made with electronic diagnostic equipment employing engine transducers, during three successive acceleration bursts from a low engine speed to a high engine speed is compared against the second and third ones thereof, the percentage difference therebetween being an indication of air accumulated at the fuel intake of the internal combustion engine.

6 Claims, 3 Drawing Figures

1

ENGINE AIR-IN-FUEL DIAGNOSTICS

CROSS REFERENCE TO RELATED APPLICATIONS

The disclosure herein utilizes horsepower measurements disclosed and claimed in a commonly owned, copending application, Ser. No. 684,289, SUBCYCLIC SPEED AND CYCLIC TIME MEASUREMENTS FOR INTERNAL COMBUSTION ENGINE HORSEPOWER INDICATION, filed on May 7, 1976 by Willenbecher et al now U.S. Pat. No. 3,993,643. The invention may utilize a cylinder identification signal centering means disclosed and claimed in a commonly owned, copending application, Ser. No. 684,221, ENGINE, CYLINDER IDENTIFICATION (CID) TRANSDUCER, filed on May 7, 1976 by Tedeschi.

BACKGROUND OF THE INVENTION

1. Field of the Invention

This invention relates to engine diagnostics, and more particularly to determining the presence of air at the fuel intake of an internal combustion engine.

2. Description of the Prior Art

In the fuel system of internal combustion engines, a fuel pump is normally disposed in proximity to the engine, and pulls a vacuum between it and the fuel tank so as to draw fuel to the engine. If there are minor leaks in the fuel system, air can be drawn into the fuel. Although a small amount of air in the fuel does not hamper steady state engine operation, air in the fuel can accumulate at the fuel pump during periods when the engine is shut off or idling. This can cause roughness, skipping and loss of power in the engine. When the air accumulates with the engine off, hard starting may result.

Typically, the air which accumulates at the fuel intake of the engine is purged by a full power acceleration burst; thereafter only minute amounts of air being distributed in the fuel.

SUMMARY OF THE INVENTION

The object of the invention is to detect air in the fuel at a fuel intake of an internal combustion engine.

According to the present invention, a measure of horsepower is made in a series of successive acceleration bursts from a low speed to a high speed, the first measure of horsepower being compared to subsequent measures of horsepower, and a discrepancy in the horsepower reading of the first measurement compared to a subsequent one is an indication of air in the fuel at the intake of the engine.

The present invention provides simply, without disassembly of the fuel system and without a dynomometer, for detection of air which accumulates at the fuel intake of an internal combustion engine. The invention may be readily implemented with known technology and utilized in conjunction with other and comprehensive diagnostic procedures.

The foregoing and other objects, features and advantages of the present invention will become more apparent in the light of the following detailed description of preferred embodiments thereof, as illustrated in the accompanying drawing.

DESCRIPTION OF THE PREFERRED EMBODIMENTS

Figure 1:
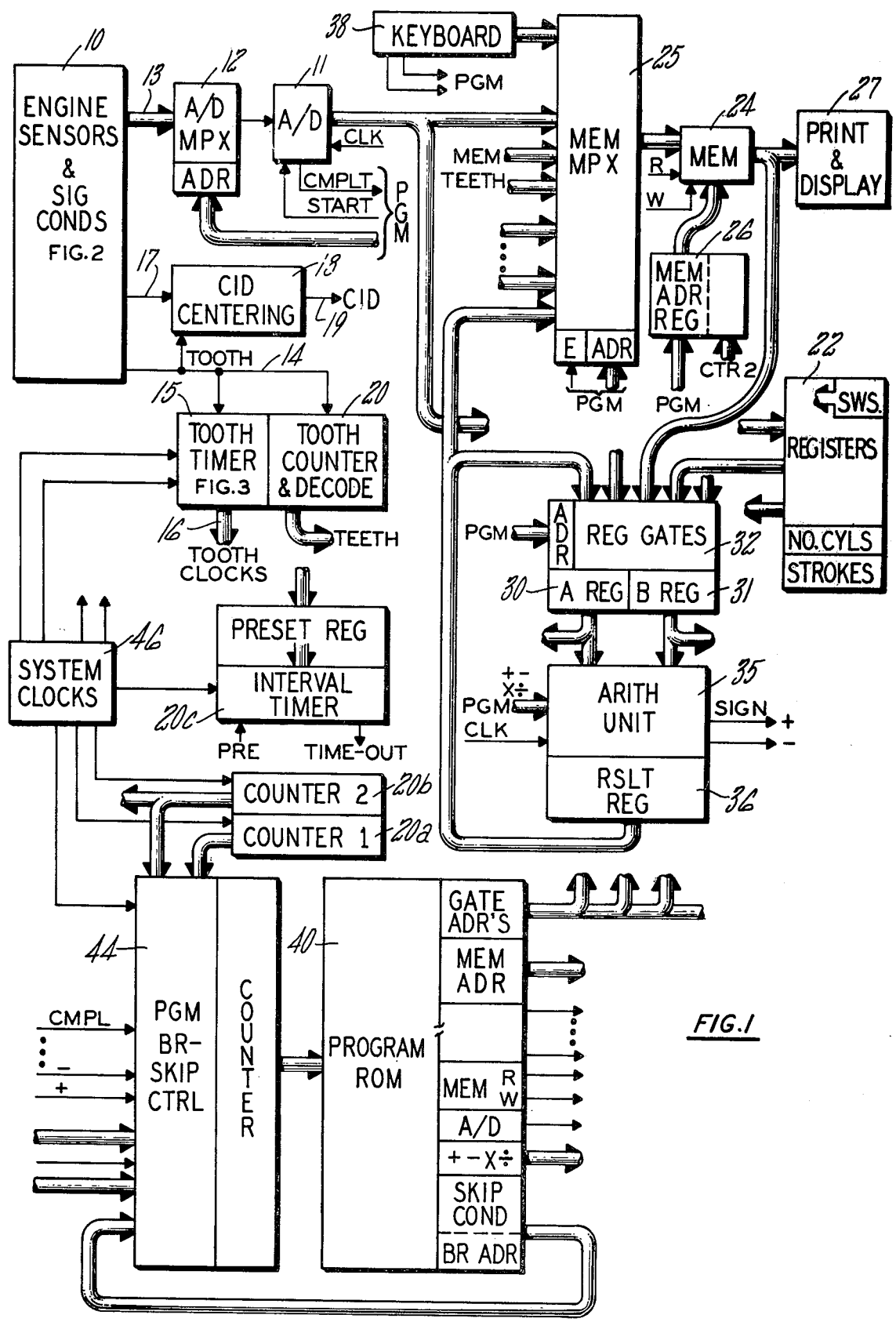
FIG. 1 is a simplified schematic block diagram of a diagnostic system including engine parameter sensing apparatus and exemplary electronic processing apparatus, in which the present invention may be incorporated.

Referring now to FIG. 1, a system which may incorporate the present invention is illustrated as representing the architecture of a typical data processing system or computer together with special purpose apparatus related to an engine diagnostic system of the type in which the invention may be incorporated. Specifically, the system incorporates engine sensors and signal conditioners 10 of a well known type which are adapted to be disposed for response to various parameters or discrete conditions on an engine under test, as described more fully hereinafter. Some of the sensors relate to pressures, temperatures and the like and are therefore analog signals, the magnitude of which is a measure of the parameter being sensed. These outputs of the sensors are fed over lines 13 to an analog to digital converter (A/D) 11 when selected by an A/D multiplexer 12 in response to a particular sensor address applied thereto by the program of the data processor. In addition, a tooth sensor may sense the passage of teeth on the flywheel of the engine to provide a tooth signal on a line 14, the intertooth time interval of which (when the engine is running) is measured by a tooth timer 15 and provided on tooth count lines 16. Another discrete signal is a cylinder or cycle identification signal (CID) on a line 17 which is applied to a CID centering circuit 18 to provide a CID signal on a line 19. The raw CID signal on the line 17 is a signal from a proximity sensor disposed to sense movement of an engine member once in each cycle of the engine, such as the rocker arm for the intake valve of one of the cylinders or a cam, if desired; this provides information of the cylinder-by-cylinder position of the engine at any moment in time in the same fashion as the number one firing in a spark ignition engine, and also provides cycle-to-cycle division of the engine's angular position as it is running or cranking.

In accordance with the invention, the parameters of the engine as provided through the A/D converter 11, and the instantaneous position information with respect to the engine as provided by the CID signal on the line 17 and the tooth signals on the line 14 may be used in diagnosis of the engine in accordance with the invention herein.

Additional special apparatus which may be used (although as described hereinafter is not necessarily required) includes a tooth counter and decode circuit 20, and a pair of counters 20a, 20b referred to as counter 1 and counter 2, and an interval timer 20c, and special purpose registers 22, which may be used (as an alternative to memory) to retain certain factors that are used so often as to render it advisable to have them directly available to the program rather than having to access them in memory, in order to cut down processing time and complexity of programming. Such registers may contain factors utilized in processing data (such as multiplicands used in digital filtering of the data and the like) and information relating to the particular engine under test (such as number of strokes and cylinders) which may be entered by switches manipulated by an operator, the switches feeding binary decode circuits such that the decode constantly reflects the position of the switch on a steady state basis in the manner of a register.

The remainder of FIG. 1 is illustrative of one type of data processing apparatus, which is shown for illustrative purposes herein since it is a type that may be advantageous for use where general purpose programming is not required, but rather limited functions are to be performed. A computer, as is known in the art, includes memory (or accessible storage), and arithmetic unit, program control, and the necessary gates, data flow and event decode or monitoring circuits so as to permit advancing logically through the steps which are to be performed. Specifically, a memory 24 may be loaded from a variety of inputs shown on the data flow under control of a memory multiplexer 25 which is enabled and addressed by the program so as to select which of the possible inputs to memory are to be applied thereto, if any. The memory 24 is responsive to a memory address register 26 which may respond to a counter used in program control in a usual fashion. The output of the memory is available to other portions of the data flow, such as print and display apparatus 27 and the arithmetic apparatus including arithmetic unit input registers, referred to herein as an A register 30 and a B register 31 under control of register gates 32 which are controlled by the program in a known fashion. Herein, the output of the A register and the B register is available to the register gates 32 and to the main data flow, so that their contents may be moved between the registers 30, 31 or to the memory 24. This is to facilitate the particular type of processing which may be employed in an engine diagnostic system, as is described more fully hereinafter. The registers 30, 31 feed an arithmetic unit of a known type 35, the function of which, controlled by the program, is to add, subtract, multiply or divide, to provide answers to a result register 36 as well as providing indications of the sign of the result. As indicated in FIG. 1, the result register may be available at the input to the arithmetic unit through the gates 32; alternatively, as is common in many computers the result register could be automatically one of the inputs to the arithmetic unit, and it can be loaded directly from the memory upon a proper command.

In order to provide data inputs to the memory for initialization and to permit a degree of control over the system during processing, a keyboard 38 of a usual variety may be provided. In addition to data inputs, the keyboard may have control function keys that permit choice to the operator of loading memory from the result register or of loading memory in response to the keyboard, depending upon conditions which may be displayed in the print and display apparatus 27.

For the rather limited number of tests being performed in apparatus incorporating the present invention, the program may be controlled in a variety of ways. One way is a program ROM 40 which provides input gate addresses to control the inputs to the memory, the arithmetic input registers, and the A/D converter, etc.; the memory address; the functions to be performed by the arithmetic unit, and other commands such as commands to the memory to cause it to read or write, and to start the A/D converter 11, and the like. Sequencing is controlled by unconditional branch instructions (which provide a branch address) and by skip instructions (dependent on conditions) provided to a branch/skip control 42 at the input to the program counter 44, which is also responsive to system clocks 46. Thus, as is known, for each program clock signal received from the system clocks, the program counter may be advanced, skipped one or twice, or reset to the branch address, in dependence upon the presence of branch or skip instructions.

It should be understood that the particular processing apparatus used, and the degree of use of special purpose apparatus, is dependent upon the particular implementation of the present invention which is to be made, and forms no part of the present invention. If the invention is utilized in a complex, sophisticated diagnostic system in which a variety of diagnostic functions are required, then the type of apparatus selected for processing may be more sophisticated and capable of general purpose utilization in order to accommodate the special requirements of all of the diagnostic procedures to be performed. However, the cost of programming complexity of such a processing system may be unwarranted in a diagnostic system which performs either relatively few or relatively simple tests. As is more apparent in the light of detailed operational descriptions hereinafter, well known processing systems (such as NOVA and PDP/11) employing only programs provided through techniques well known in the art, may be utilized in conjunction with the engine sensors and conditioners 10, suitable input and output apparatus (such as keyboard 38 and the print and display apparatus 27) and, depending on the processing power of the data processing system selected, some special purpose hardware which may be found advisable, such as the tooth timer 15, the tooth counter 20 and some special registers 22. However, the well known processing systems referred to hereinbefore can provide adequate memory capacity to perform the tooth timing and counting functions, and to provide for the storage of all required parameters and engine information in the memory, as is readily apparent to those skilled in the art.

Figure 2:
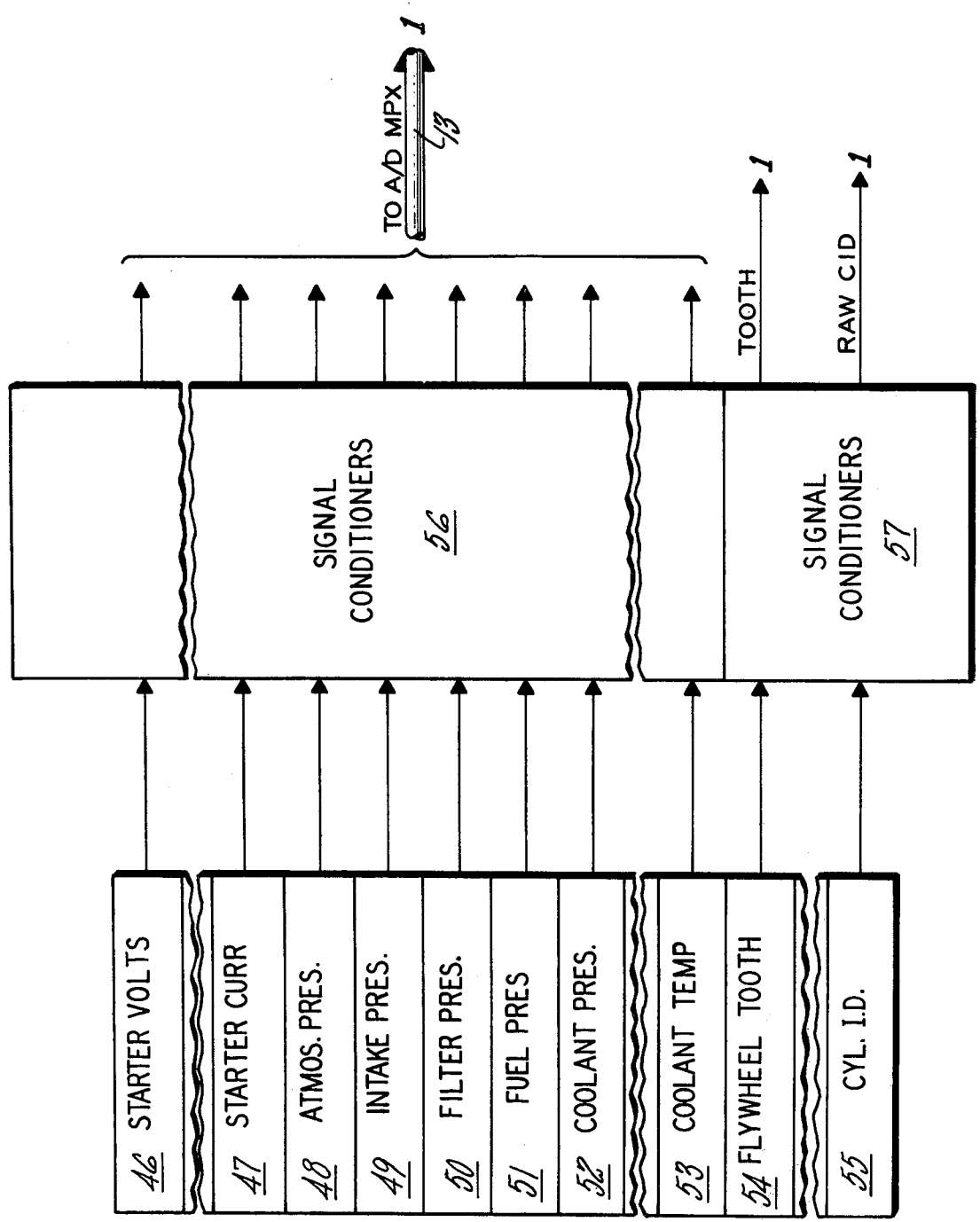
FIG. 2 is a simplified block diagram of engine parameter sensing apparatus for use in the embodiment of FIG. 1.

Referring now to FIG. 2, a plurality of engine sensors in a diagnostic system incorporating the present invention may include, among others not shown in FIG. 2, a starter voltage probe or clamp 46, a starter current probe 47, an atmospheric pressure transducer 48, which could be disposed in general proximity to the engine under test, a pressure transducer 49 to measure the intake manifold air pressure, a filter pressure transducer 50 to measure the pressure of the fuel downstream of the fuel inlet filter, a fuel pressure transducer 51 to measure the pressure at the fuel injector inlet rail of the engine, a coolant pressure transducer 52 which may preferably measure the pressure of coolant at the inlet to the coolant thermostat, a coolant temperature transducer 53 to measure coolant temperature, preferably at the inlet to the thermostat. In a diagnostic system incorporating the present invention there may also be a proximity sensor 54, which may comprise an RGT Model 3010-AN Magnetic Proximity Sensor, provided by Electro Corporation, Sarasota, Fla., for sensing the passage of flywheel teeth past a particular point adjacent to the flywheel housing, and a proximity sensor 55 such as a Model 4947 Proximity Switch distributed by Electro Corporation, for sensing the presence of an engine member which moves in a unique fashion once in each cycle of the engine, which is one revolution in a two stroke engine or two revolutions in a four stroke engine. The proximity sensor 55 may preferably be mounted through the valve cover adjacent to a rocker arm related to the intake valve of one of the cylinders of the engine, thereby to provide information as to the particular point of an engine cycle once in each cycle, as well as to delineate successive engine cycles as the engine is rotating.

Each of the sensors of FIG. 2 is applied to a suitable one of a plurality of signal conditioners 56, 57 to filter out unwanted noise, and to provide, through an amplifier, suitable level adjusting as is appropriate for the circuitry being fed thereby. For instance, the signal conditioners 56 scale the signals to the proper level so that each of them can be fed through a common A/D converter 12 (FIG. 1). The signal conditioners 56, 57 can be suitable ones of a wide variety known in the art, and form no part of the present invention.

Figure 3:
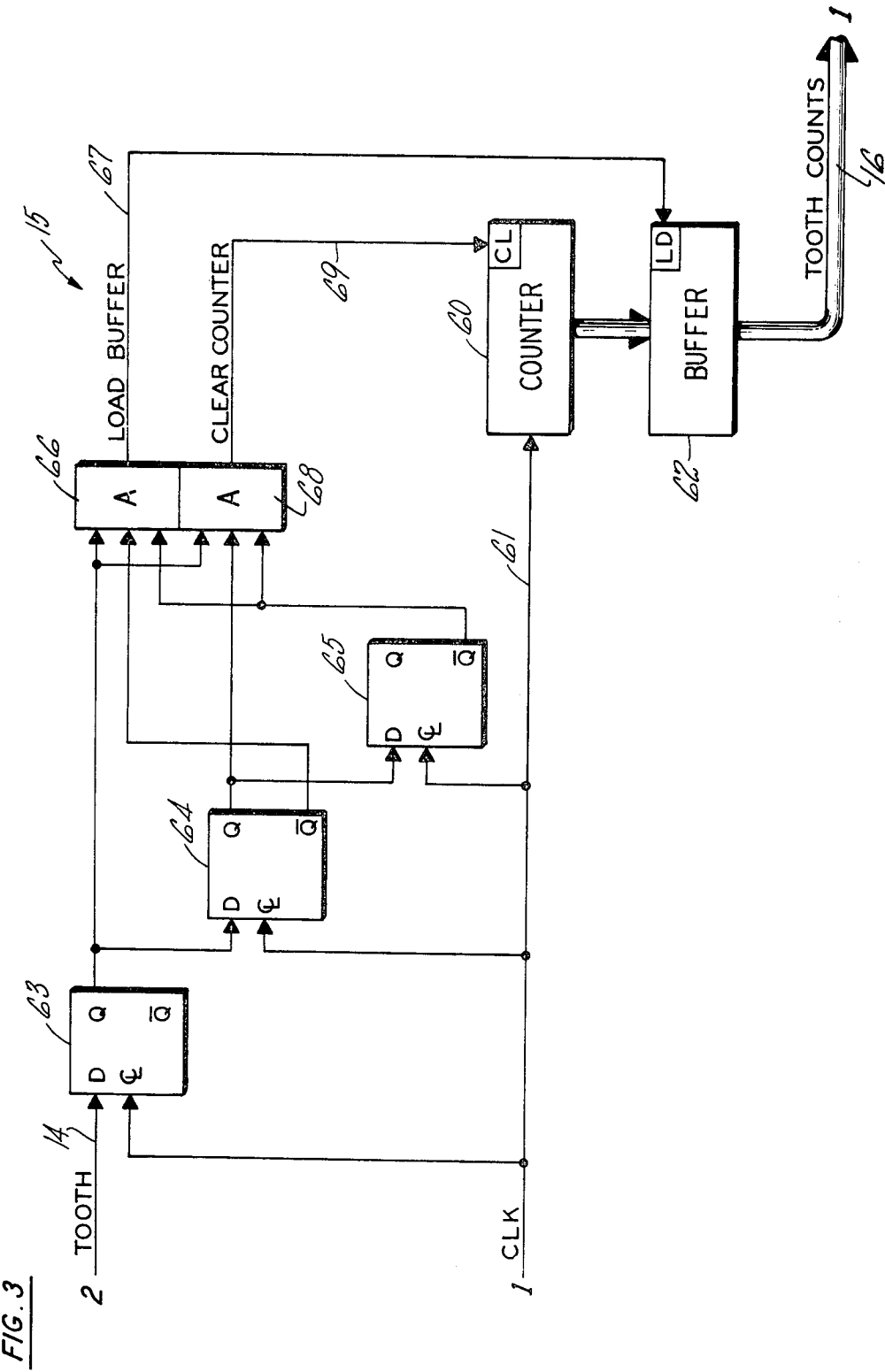
FIG. 3 is a simplified schematic diagram of tooth timer means for obtaining instantaneous, sub-cyclic engine speed in the embodiment of FIG. 1.

Referring now to FIG. 3, the tooth timer 15 includes a counter 60 which repetitively counts clock pulses on a line 61 that may be supplied by system clocks 46 in FIG. 1. The counter is parallel-fed to a buffer 62, the output of which comprises the tooth counts. The counter is running substantially all of the time since a very high frequency clock signal can be utilized on the line 61 (anywhere from tens to KHz to tens of MHz) whereas at speeds from 300 rpm to 2,000 rpm the frequency of the tooth signals on the line 14 may be on the order of 10 Hz to 100 Hz, depending upon the number of teeth. Thus the few clock signals lost during the tooth to tooth resetting of the counter are miniscule.

Each time that a tooth signal appears on the line 14, the next clock signal will set a D-type flip flop 63, the Q output of which is applied to a D-type flip flop 64. The second clock signal following the tooth signal therefore sets the D-type flip flop 64, and since its Q output is applied to a D-type flip flop 65 the third clock signal will cause it to become set. The very first clock signal, after the appearance of the tooth signal, is decoded by an AND circuit 66 since it responds to Q of flip flop 63 and not Q of flip flops 64 and 65; this provides a load buffer signal on a line 67 to cause the buffer 62 to be loaded in parallel from the counter 60. The second clock signal following the appearance of the tooth signal will cause an AND circuit 68 to respond to the Q of flip flops 63 and 64 and the not Q of flip flop 65 so as to generate a clear counter signal on a line 69 which is applied to the clear input of the counter 60 causing it to be cleared to zero. The third clock signal, by setting the flip flop 65, simply eliminates the clear counter signal on the line 69 so that the next leading edge of the clock signal and all subsequent clock signals will be counter in the counter 60. Whenever the tooth signal disappears, (which is totally immaterial) the next three clock signals in a row will cause resetting of the flip flops 63-65, in turn, since each of their D inputs will go down. The counter and the buffer are independent of the resetting of the flip flops 63-65 since both AND circuits 66, 68 operate only during a progression with flip flop 63 on and flip flop 65 off, which does not occur during the resetting of the flip flops.

Thus the tooth timer 15 provides tooth counts on the line 16 which are stable, throughout substantially each intertooth interval. The processing apparatus of FIG. 1 may therefore sample the tooth counts at random. The tooth timer 15 thereby provides very accurate, subcyclic speed measurement, on a tooth to tooth basis, which provides speed indications many times within each individual cylinder stroke portion of each engine cycle.

In the detailed description of exemplary processing hereinafter, the term "ringgear" is sometimes used in place of "flywheel"; they mean the same thing; the abbreviation "RGT" means "ringgear teeth", a stored factor indicating the number of teeth on the flywheel of the engine under test. This may be determined and entered from engine specifications, or as set forth in a commonly owned copending application of Stick et al, Ser. No. 684,037, entitled DETERMINATION OF NUMBER OF TEETH ON AN INTERNAL COMBUSTION ENGINE FLYWHEEL. Other abbreviations include: "RSLT" = result register; "MEM" = memory; "Ctr" = counter; "Factor" means a memory location or a register where the factor is available; "CMPLT" means A/D conversion is completed; "*spd*" means speed; and other abbreviations are apparent in the drawing. Parentheticals after "MEM", such as "(Freq)" indicate addresses, chosen at will by the programmer, or partially determined by counter two, if so indicated.

As decribed briefly hereinbefore, minor leaks in the fuel system can cause the fuel pump, as it pulls a suction to the fuel tank, to suck air into the fuel lines. Typically, the air collects in the top of the fuel pump when the engine is idling for a few minutes. Then, when full throttle is applied, the fuel picks up some air and results in loss of power, or roughness in the engine. Hard starting can result as well. However, if the leak is not too great, the accumulation of air is purged out of the fuel in response to full throttle feeding of fuel. Thus, the present invention detects air accumulation of the fuel pump by comparing indications of horsepower measured during a first acceleration burst with indications of horsepower measured on a subsequent acceleration burst, or the average of several successive acceleration bursts. Thus, if a low horsepower reading is determined on a first burst, but higher horsepower readings are determined on successive bursts of acceleration, air in the fuel is thus indicated.

In order to make the horsepower measurements, the description of exemplary operation of typical processing apparatus given hereinafter follows the measurements of speed and time as set forth in the aforementioned Willenbecher et al application, in three successive acceleration bursts (for example only) and a comparison of the results thereof. In the following description, it is assumed that the display apparatus is capable of indicating that the operator should allow the engine to idle at low speed by means of displaying a "Lo spd" indication, and that he should advance the throttles to a high speed by displaying a "Hi spd" indication. This is not necessary for performance of the air in fuel test according to the present invention; however, it can be very convenient when the air in fuel test is interleaved between other tests so that the operator can synchronize throttle operation of the engine with the workings of the processor.

As decribed briefly hereinbefore, it is assumed that factors which are needed are stored in memory locations for which the factors are known, or are stored in the fixed registers 22 which are set aside therefore; in either event, the programmer can insert the proper instruction so as to reach factors which are necessary. For instance, as is described briefly hereinbefore, for any given engine under test, an emperical constant that relates torque and speed to horsepower must have previously been determined and entered into the system in a well known fashion. This may be entered through the keyboard either to fixed registers or to a suitable address in memory in accordance with the desires of the programmer and the characteristics of the given processing apparatus which may be utilized to implement the present invention. Similarly, factors such as 2 and 100 (to provide averages and percentages) may similarly be stored in suitable portions of memory or in suitable ones of the working registers 22.

For a more accurate CID signal, the CID centering apparatus 18 of FIG. 1 may be in accordance with a commonly owned, copending application filed May 7, 1976 by Tedeschi, Ser. No. 684,221, entitled ENGINE, CYLINDER IDENTIFICATION (CID) TRANSDUCER.

At the start of the air in fuel diagnostic process described hereinafter, it is well to insure that both counters 1 and 2 are reset, and to insure that the operator allows the engine to reach a low speed so that the computer will thereafter be monitoring speed as it is increasing during an acceleration burst. If desired, a test to insure that the engine is at a low speed (similar to the test for the threshold speed described hereinafter) may be performed before allowing the processing system to proceed with the overall test. However, since this forms no part of the invention and is obvious from the other speed determinations described hereinafter, it is eliminated herefrom for simplicity. Thus, the initializing instructions may be as follows:

1. Reset Counter 1
2. Reset Counter 2
3. Display Lo Spd

The speed measurements herein are made by the tooth timer, which senses the passage of teeth and records a count of the number of clock signals fed to a counter on a tooth-to-tooth basis. The fraction of a revolution traversed as each tooth passes the sensor is simply the ratio of one divided by the total number of teeth. The number of teeth on the flywheel may be determined as set forth in a commonly owned, copending application, Ser. No. 684,037, DETERMINATION OF NUMBER OF TEETH ON AN INTERNAL COMBUSTION ENGINE FLYWHEEL, filed on May 7, 1976 by Stick et al. The time for that fraction of a revolution to occur is simply the counts of the interval timer divided by the frequency of clock signals fed to the interval timer. Since frequency of the clock feeding the counter is expressed in Hz, and speed is normally expressed in revolutions per minute, a factor of 60 must be employed in a well known fashion. To actually determine the speed from the counts provided by the tooth counter the relationship is the ratio of one tooth to the total number of teeth, which is divided by the ratio of the counts to the frequency (the frequency in turn having to be first divided by 60 to yield a result in rpm's). Rewritten, this results in the frequency of the clock times 60, all of which is divided by the total number of flywheel teeth times the counts in the timer. This may be predetermined as a speed factor, so that any time a speed reading is required, it can be taken simply by dividing the speed factor by the number of counts in the timer, according to the following instructions:

4. Load MEM (Freq) to A REG
5. Load MEM (RGT) to B REG
6. Divide
7. Load RSLT to A REG
8. Load 60 Factor to B REG
9. Multiply
10. Load RSLT to MEM (Spd Factor)

On the other hand, when comparing the actual speed of the engine as determined by the tooth timer with predetermined speeds (such as starting speed for horsepower measurement) one can reverse the position of speed and counts in the relationships described hereinbefore and determine in advance the number of counts which the tooth timer will have when the engine has a predetermined speed. This is done generally by multiplying the frequency of the clock times 60, all of which is divided by the product of the total number of teeth on the flywheel and the desired starting speed in rpm. This can be accomplished in the exemplary diagnostic system of FIG. 1 with the following instructions:

11. Load MEM (Freq) to A REG
12. Load MEM (RGT) to B REG
13. Divide
14. Load RSLT to A REG
15. Load MEM (Start Spd) to B REG
16. Divide
17. Load RSLT to A REG
18. Load 60 Factor to B REG
19. Multiply
20. Load RSLT to B REG Now the computer is ready to commence the tests and so it first indicates to the operator to accelerate the engine and it advances counter 2 to indicate that this is the first of three accelerations for which horsepower will be determined. This may utilize the following two instructions:

21. Display Hi Spd
22. Advance Counter 2

Then the system can simply monitor the tooth timer counts, continuously subtracting the tooth timer counts from the predetermined counts. Since counts become smaller and smaller as the speed increases, when the speed of the engine exceeds the predetermined speed, then the predetermined counts will exceed the tooth timer counts and this can be determined by doing a reverse subtract and looking for a negative result as set forth in the following instructions:

23. Load Tooth timer to A REG
24. Subtract; Skip one if
25. Branch to 23

In the exemplary embodiment of the present invention, four cycles of acceleration are monitored, the precise starting of each of the four cycles being indicated by the presence of the CID signal. After the first CID signal, speed is instantaneously read and an interval timer is started; then three CID signals are allowed to pass, and after the fourth CID signal, speed is again instantaneously read and the interval timer is stopped. This may be accomplished herein according to the following pattern of exemplary instructions:

26. Skip one if CID
27. Branch to 26
28. Load Tooth timer to MEM (1st Spd)
29. Start interval timer
30. Skip one if CID
31. Branch to 30
32. Advance Counter 1
33. Skip 1 if Counter 1 = 3
34. Branch to 30
35. Skip one if CID
36. Branch to 35
37. Load Tooth timer to MEM (2nd Spd)
38. Stop interval timer 39. Load interval timer to MEM (time)

At this point in time, information which is very accurate has been derived and stored in memory relative to the first and second speeds and the time interval between them.

Since the information required for the determination of horsepower during the first acceleration burst has been acquired by the processor, the processor can now indicate to the operator to allow the engine to return to a low speed, and then can operate on the data which has been required to provide an indication of horsepower during the first test while the engine is decelerating to a low speed, as set forth in the next-following instructions. On the other hand, of course, in any given implementation of the present invention, all the calculations could be performed after all of the data had been acquired, although a slightly larger amount of storage space would be utilized in such a case. Since speed is determined by the speed factor of instructions 4–10 divided by the counts sensed in the tooth timer, subtracting of the counts and then combination with the factor would be erroneous; instead, speed must be converted first to rpm and then a subtraction made, if the particular manner of utilization of the information derived in instructions 26–39 is to be utilized. Thus determination of speed in rpm's may be in accordance with the following instructions:

40. Display Lo Spd
41. Load MEM (1st Spd) to B REG
42. Load MEM (Spd Factor) to A REG
43. Divide
44. Load RSLT to MEM (1st Spd)
45. Load MEM (2nd Spd) to B REG
46. Divide
47. Load RSLT to A REG
48. Load MEM (1st Spd) to B REG
49. Subtract
50. Load RSLT to MEM (Spd Difference)

Thus the exemplary embodiment herein uses precise cyclic measurements of the CID signal together with precise sub-cyclic measurements of speed to provide a very accurate indication of the relationship between speed and time over an interval of an acceleration profile of an engine, the interval being related directly to its sub-cyclic fluctuations by the CID signal, whereby much more accurate information as to speed and time interval is made available, for use in the horsepower comparisons of the invention.

The foregoing is a determination of speed and time indications in accordance with the aforementioned Willenbecher et al application. These indications are, as described hereinafter, converted to indications of horsepower, and then the entire process is repeated two more times, and an average of the second two is made. Then the difference between the average and the first horsepower measurement is utilized to determine the percentage that the first measurement is down from the average of the two, as an indication of air in fuel.

In order to determine the indications of horsepower, an indication of acceleration is required. This is the speed difference of instruction 51 divided by the time which lapsed during the burst, which is indicated by the interval timer word loaded into memory by instruction 39. And, as is known, torque is equal to the product of inertia and acceleration; in this embodiment, inertia is accomodated in an emperical way in a constant. Then, horsepower is the product of torque and speed. Speed is taken as the average speed during the acceleration burst, which is therefore one half of the sum of the first and second speeds determined in instructions 41–47 hereinbefore. But the one half factor can also be accommodated in a constant, if desired, to simplify the calculations each time that the test is performed by the processing equipment. Thus the next step in determining horsepower is to add the two speeds which were determined in instructions 43 and 46; these two speeds will reside in the A register and B register, respectively, so that a simple addition will provide a factor proportional to the average speed during the burst. Then this need only be multiplied by the speed difference determined in instruction 50 and divided by time which is a known constant variable of the interval timer word. This may therefore be in accordance with the following instructions:

51. Add
52. Load RSLT to A REG

Thus speed is now available in the A register.

53. Load MEM (Spd Difference) to B REG
54. Multiply
55. Load RSLT to A REG

At this point, the product of the speed difference and the average speed is in the A register.

56. Load MEM (time) to B REG
57. Divide
58. Load RSLT to A REG

The A register now contains the product of the speed difference at either end of the burst and the average speed during the burst, divided by the time of the burst across which the speed measurements were made. All that remains is to multiply by the horsepower constant (which is emperically determined as described hereinbefore) and store the results as follows:

59. Load MEM (H.P. Constant) to B REG
60. Multiply
61. Skip 2 if Ctr 2 = 3
62. Load RSLT to MEM (H.P. - Ctr 2)
63. Branch to 21

In the case of the first and second bursts, the horsepower measurements are stored away in memory and the progam branches back to instruction 21 to repeat the process again. However, once counter two is set to 3 and the horsepower has been determined in instruction 60, instruction 61 causes the loading of the result to memory and the branching back to the beginning of the program to be skipped so that the comparison between the three bursts can be made to determine whether or not air in fuel is indicated. To do this the last result is added to the second result and divided by two so as to provide an average horsepower for the second two bursts, as follows:

64. Load RSLT to A REG
65. Reset Counter 2
66. Advance Counter 2
67. Advance Counter 2
68. Load MEM (H.P. - Ctr 2) to B REG
69. Add
70. Load RSLT to A REG
71. Load 2 Factor to B REG
72. Divide The average then has subtracted from it the horsepower calculated in the first burst, the resulting differential is divided by the average and the result multiplied by 100 to provide a percentage that the first burst is below the second two bursts in horsepower, as follows:

73. Load RSLT to A REG
74. Reset Counter 2

75. Advance Counter 2
76. Load MEM (H.P. - Ctr 2) to B REG
77. Subtract
78. Load A REG to B REG
79. Load RSLT to A REG
80. Divide
81. Load RSLT to A REG
82. Load 100 Factor to B REG
83. Multiply The result is a percentage which is indicative of the amount of air in the fuel. If the percentage is 7% or less, as an example, it can be deemed to be not indicative of excess air in the fuel; however, if the first burst horsepower is 7% more lower than the horsepower determined as the average of two subsequent bursts, then it is indicative of too much air in the fuel. This result can be used in any fashion as desired, in subsequent operations, or simply to indicate the result to the operator, as follows:

84. Load RSLT to MEM (Air in Fuel)
85. Load MEM (Air in Fuel) to Display
86. End Operation The foregoing description is based upon the particular time and speed measurements set forth in the aforementioned Willenbecher et al application. On the other hand, these measurements could be made in other ways, in dependence upon the degree of accuracy required and the suitability to any particular processing apparatus and methods which are available. The measurements may also be made in accordance with a commonly owned, copending application entitled SUB-CYCLIC MEASUREMENTS OF SPEED AND TIME FOR INTERNAL COMBUSTION ENGINE HORSEPOWER INDICATION, Ser. No. 684,217, filed on May 7, 1976 by L. R. Armstrong. Also, although three bursts are used, an additional number of bursts may be used if desired. Similarly, each of the horsepower measurements may be made with a greater or lesser span of time if desired. The particular percentage used as an indication of air in fuel can be adjusted as necessary to provide the desired results, depending on the type of processing equipment, the sensors, and the particular engines under test. The horsepower constant need not be used for this test since it is canceled in the comparison; however, if horsepower per se is also desired, the constant may be used as disclosed.

Similarly, although the invention has been shown and described with respect to an exemplary embodiment thereof, it should be understood by those skilled in the art that the foregoing and various other changes, omissions and additions in and to the form and detail thereof may be made therein without departing from the spirit and the scope of the invention.

Having thus described a typical embodiment of my invention, that which I claim as new and desire to secure by Letters Patent is:

1. Apparatus for providing an indication of air accumulated at the fuel intake of an internal combustion engine as the engine is caused to undergo successive acceleration bursts from a low speed to a high speed, comprising:
   speed sensing means, adapted to be disposed for response to mechanical rotation of the engine for successively providing speed manifestations indicative of the angular speed of the engine;
   an interval timer; and
   processing means responsive to said speed sensing means and said interval timer for providing an indication related to horsepower for each of said acceleration bursts and for comparing the horsepower-related indication generated for a first one of said bursts with a horsepower indication generated for a subsequent one of said bursts, and providing a manifestation of the difference thereof, said difference manifestation comprising an indication of the air accumulated in the fuel at the fuel intake of said engine.

2. Apparatus for providing an indication of air accumulated at the fuel intake of an internal combustion engine as the engine is caused to undergo successive acceleration bursts from a low speed to a high speed, comprising:
   speed sensing means, adapted to be disposed for response to mechanical rotation of the engine for successively providing speed manifestations indicative of the angular speed of the engine;
   an interval timer;
   means for registering a manifestation of an emperically-related horsepower constant; and
   processing means responsive to said speed sensing means, said interval timer, and said registering means for providing an indication related to horsepower for each of said acceleration bursts and for comparing the horsepower-related indication generated for a first one of said bursts with a horsepower indication generated for a subsequent one of said bursts, and providing a manifestation of the difference thereof, said difference manifestation comprising an indication of the air accumulated in the fuel at the fuel intake of said engine.

3. Apparatus for providing an indication of air in the fuel at the fuel intake of an internal combustion engine, comprising:
   speed sensing means, adapted to be disposed for response to mechanical rotation of a portion of the engine through successive known angles which are a small fraction of a full revolution of the engine, for successively providing measured data manifestations of the time elapsed during angular revolution of the engine through said known angles;
   an interval timer operative in response to start and stop command input signals applied thereto to commence timing of an interval and to cease timing of said interval, and to provide an elapsed time manifestation indicative of the interval of time measured thereby;
   means for registering a manifestation of an emperically-related horsepower constant;
   display means operative in response to alternative corresponding signals to display a low speed indication or a high speed indication; and
   processing means operative to provide a signal to said display means to cause it to display in succession a low speed indication followed by a signal to said display means to cause it to display a high speed indication, a plurality of times, and operative after each occurrence of causing said high speed indication to provide a start command input signal to said interval timer and to register said measured speed manifestation, and to thereafter provide a stop command input signal to said interval timer and to register said measured data speed manifestation, and to compute therefrom indications of the change in speed over said time interval and the average speed therefrom, and from said horsepower constant manifestation, calculating a horsepower indication related to said speeds and said time interval by an emperical constant, said processing means comparing the horsepower indications derived following a first occurrence of causing said high speed indication with the horsepower indications derived following at least one subsequent occurrence of causing said high speed indication, to provide an indication of air in fuel.

4. In the method of determining the presence of air accumulation in the fuel intake of an internal combustion engine, the steps of:
   measuring an indication of horsepower in each of a plurality of successive acceleration bursts from a low engine speed to a high engine speed; and
   comparing the measured indication of horsepower for a first one of said acceleration bursts to the indications of horsepower for at least one successive one of said acceleration bursts.

5. The method according to claim 4, wherein said at least three acceleration bursts are employed and the measured indication of horsepower for said first burst is compared to the average of the indications for the successive bursts.

6. In the method of testing an internal combustion engine for air in the fuel at the fuel intake thereof, the steps of:
   causing the engine to undergo a plurality of successive acceleration bursts from a low speed to a high speed;
   for a time interval during each of said acceleration bursts, providing electrical manifestations of the duration of said time interval and of the speed of the engine at the beginning and at the end of said time interval;
   from said speed and time indications, electronically providing a manifestation relating to engine horsepower demonstrated during the related one of said acceleration bursts; and
   comparing the horsepower related manifestation for the first of said acceleration bursts with the horsepower manifestation related to at least a subsequent one of said acceleration bursts, the discrepancy therein being a measure of the air in fuel at the intake of said manifold at the start of said first acceleration burst.

* * * * *

UNITED STATES PATENT AND TRADEMARK OFFICE
CERTIFICATE OF CORRECTION

PATENT NO. : 4,055,995
DATED : November 1, 1977
INVENTOR(S) : Lee R. Armstrong; Henry J. Mercik, Jr.

It is certified that error appears in the above-identified patent and that said Letters Patent are hereby corrected as shown below:

Column 1, line 8 "684,289" should read --684,219--

Column 1, line 11 "3,993,643" should read --4,016,753--
and 12

Column 4, line 7 "one" should read --once--

Column 5, line 52 "counter" should read --counted--

Column 8, line 44 "Skip one if" should read --Skip one if - --

Column 9, line 61 "51" should read --50--

Column 9, line 66 "accomodated" should read --accommodated--

Column 13, line 19 "wherein said at" should read --wherein at--

Signed and Sealed this

Eleventh Day of July 1978

[SEAL]

Attest:

RUTH C. MASON
Attesting Officer

DONALD W. BANNER
Commissioner of Patents and Trademarks